Patented Aug. 3, 1943

2,325,791

UNITED STATES PATENT OFFICE 2,325,791

DIAMYL MALEATE AS AN INSECTICIDE

William Moore, Stamford, and Richard O. Roblin, Jr., Old Greenwich, Conn., assignors to American Cyanamid Company, New York, N. Y., a corporation of Maine No Drawing. Application August 30, 1941, Serial No. 408,997

2 Claims. (Cl. 167—22)

The present invention relates to an insecticide and more particularly to a compound which has proven especially effective as a contact poison for the control of insect pests and their eggs.

We have discovered that diamyl maleate possesses powerful insecticidal and ovicidal activity against sucking, soft-bodied and scale insects and their eggs, and that such activity is attained without any substantial harmful or detrimental action on the vegetation infested with the insect.

The following example in which the parts are by weight illustrates a specific method of preparing the above compound.

Example

A mixture consisting of 50 parts of maleic acid, 150 parts of amyl alcohol, 45 parts of benzene (solvent) and 10 parts of sulfuric acid (catalyst) was heated under reflux for one hour. The resulting liquid was washed with dilute caustic soda solution and then with water. After removal of the benzene and excess amyl alcohol the product was distilled under vacuum. The diamyl maleate was obtained as a light yellow liquid boiling at 120°–130° C. at a pressure of 10 mm. of mercury.

Spray solutions were prepared by dissolving the diamyl maleate in a solvent medium consisting of 65% acetone and 35% water. A 100% control was obtained when a spray of 1-500 dilution was used against the citrus red spider, *Tetranychus citri*. At the same dilution the insecticide gave a 70% control on the bean aphid, *Aphis rumicis*.

This new insecticide may be applied in any of the conventional manners. Thus, for example, it may be used in an aqueous emulsion or it may also be incorporated in organic liquids such as the aliphatic and aromatic hydrocarbons for spraying purposes. It may be effectively used in dusts with such inert solid diluents as kieselguhr, wood flour, walnut shell, talc, and the like.

While the invention has been described with particular reference to specific embodiments, it is to be understood that it is not to be limited thereto but is to be construed broadly and restricted solely by the scope of the appended claims.

This is a continuation-in-part of applicants' copending application 356,858, filed September 14, 1940.

We claim:

1. A method of combating sucking, soft-bodied and scale insects and their eggs which includes applying thereto a toxic quantity of diamyl maleate.

2. An insecticidal composition containing a toxic quantity of diamyl maleate.

WILLIAM MOORE.
RICHARD O. ROBLIN, JR.